United States Patent
Kol et al.

(10) Patent No.: US 11,133,915 B2
(45) Date of Patent: Sep. 28, 2021

(54) CABLE MODEM AND DIGITAL COMPENSATION FOR SWITCHABLE ANALOG FILTER TO ASSIST ECHO CANCELLATION IN FULL DUPLEX CABLE MODEM

(71) Applicant: MaxLinear, Inc., Carlsbad, CA (US)

(72) Inventors: Boaz Kol, Hod-Hasharon (IL); Noam Tal, Givataim (IL); Shaul Shulman, Ramat Gan (IL); Thushara Hewavithana, Chandler, AZ (US)

(73) Assignee: MaxLinear, Inc., Carlsbad, CA (US)

( * ) Notice: Subject to any disclaimer, the term of this patent is extended or adjusted under 35 U.S.C. 154(b) by 0 days.

(21) Appl. No.: 16/601,611

(22) Filed: Oct. 15, 2019

(65) Prior Publication Data

US 2020/0162230 A1    May 21, 2020

(30) Foreign Application Priority Data

Nov. 16, 2018  (EP) .................................... 18206869

(51) Int. Cl.
| | |
|---|---|
| *H04L 5/14* | (2006.01) |
| *H04B 3/21* | (2006.01) |
| *H04L 27/00* | (2006.01) |
| *H04L 27/148* | (2006.01) |

(52) U.S. Cl.
CPC .............. *H04L 5/143* (2013.01); *H04B 3/21* (2013.01); *H04L 5/1423* (2013.01); *H04L 5/1469* (2013.01); *H04L 27/0002* (2013.01); *H04L 27/148* (2013.01)

(58) Field of Classification Search
CPC ..... H04L 5/143; H04L 5/1423; H04L 5/1469; H04L 27/0002; H04L 27/148; H04B 3/21
See application file for complete search history.

(56) References Cited

U.S. PATENT DOCUMENTS

| | | | |
|---|---|---|---|
| 6,690,666 B1 | 2/2004 | Norrell et al. | |
| 10,601,462 B2* | 3/2020 | Walley | ................ H04L 12/2898 |
| 2006/0291428 A1* | 12/2006 | Filipovic | ............. H04B 1/0071 370/335 |

(Continued)

FOREIGN PATENT DOCUMENTS

EP    3349364 A1    7/2018

*Primary Examiner* — Janice N Tieu
(74) *Attorney, Agent, or Firm* — Maschoff Brennan

(57) ABSTRACT

A cable modem supporting full duplex (FDX) operations. The cable modem includes a transmit circuitry configured to process a transmit signal and a receive circuitry configured to process a receive signal. The receive circuitry includes a switchable analog filter configured to filter the receive signal. The switchable analog filter is configurable for different passband frequencies. The receive circuitry also includes a digital compensation filter configured to compensate a difference in frequency response in a specific frequency band due to switching of the switchable analog filter for a different passband frequency. The cable modem also includes an adjacent channel interference (ACI) cancellation filter and an adjacent leakage interference (ALI) cancellation filter. A digital compensation filter is also used in processing the ACI cancellation signal and the ALI cancellation signal to impose or compensate the difference in frequency response due to the switchable analog filter switching.

16 Claims, 5 Drawing Sheets

(56) References Cited

U.S. PATENT DOCUMENTS

2014/0084996 A1* 3/2014 Schwent ............ H03H 11/1291
327/551
2014/0328190 A1* 11/2014 Lord .................... H04W 24/08
370/252
2018/0287659 A1* 10/2018 Ramesh .................. H04B 3/23

* cited by examiner

CABLE MODEM AND DIGITAL COMPENSATION FOR SWITCHABLE ANALOG FILTER TO ASSIST ECHO CANCELLATION IN FULL DUPLEX CABLE MODEM

CROSS-REFERENCE TO RELATED APPLICATIONS

This application claims priority to European Patent Application No. EP18206869.2 filed Nov. 16, 2018, which is incorporated herein by reference in its entirety as if fully set forth.

FIELD

Examples relate to a cable modem supporting full duplex (FDX), more particularly a cable modem including a digital compensation system for switchable analog filter to assist echo cancellation in a full duplex system and a method of implementing the same.

BACKGROUND

FIG. 1 shows a conventional Data Over Cable Service Interface Specification (DOCSIS) network. The cable modem (CM) 110 connects to the operator's hybrid fiber coax (HFC) network 140 and to a home network, bridging packets between them. Customer premises equipments (CPEs) 130 are connected to a cable modem 110. A CPE 130 may be embedded in the cable modem 110 in a single device or they may be separate. Examples of a CPE 130 include a gateway, a home router, a set-top box (STB), a personal computer, etc. The cable modem termination system (CMTS) 120 connects the operator's back office and core network to the HFC network 140. The CMTS 120 forwards packets between these two domains and between upstream and downstream channels on the HFC network.

BRIEF DESCRIPTION OF THE FIGURES

Some examples of apparatuses and/or methods will be described in the following by way of example only, and with reference to the accompanying figures, in which.

DETAILED DESCRIPTION

Figure 1:
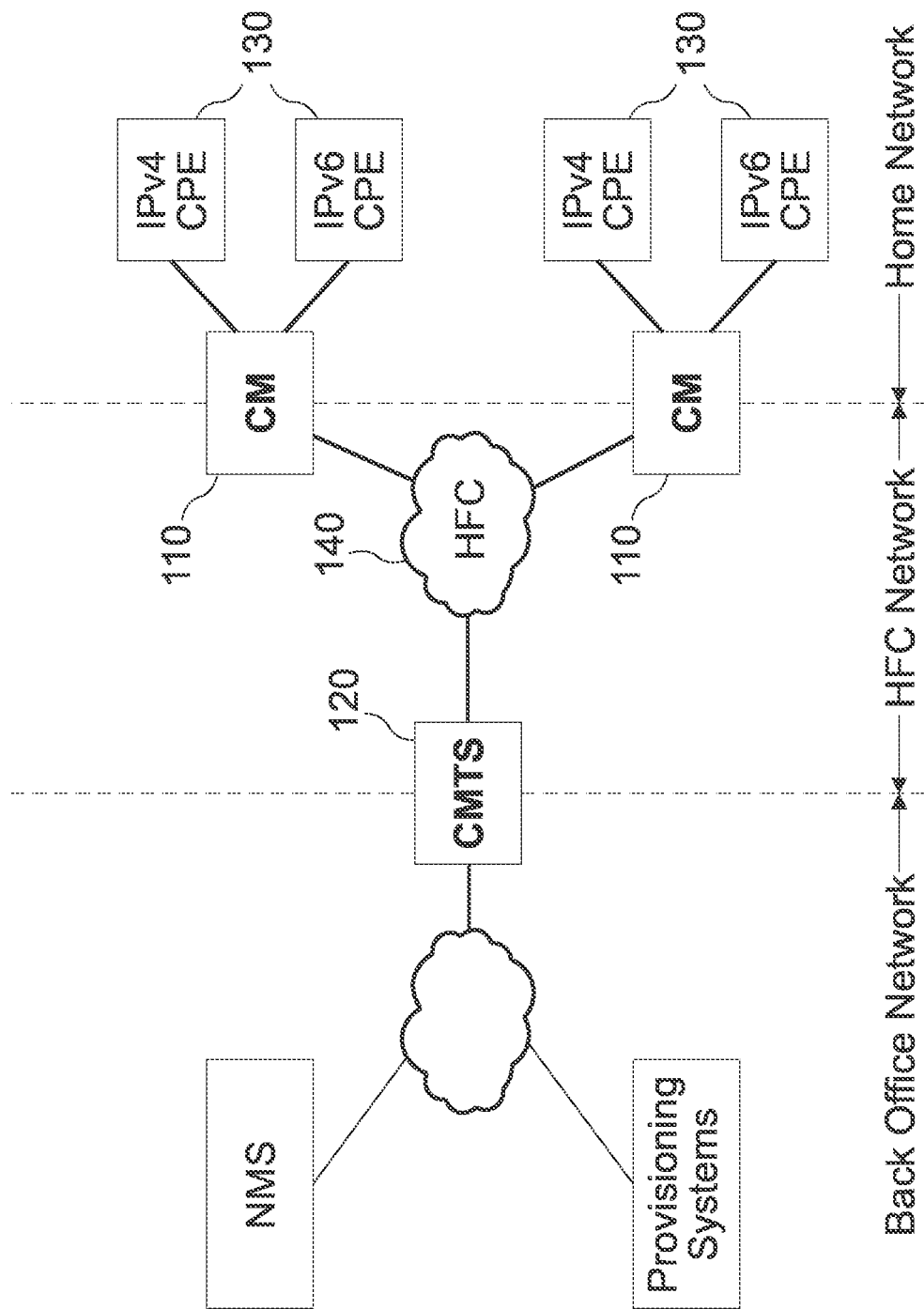
FIG. 1 shows a conventional DOCSIS network.

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of A and B". The same applies for combinations of more than 2 elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

The DOCSIS standards for the next generation HFC technology will be based on full duplex (FDX). DOCSIS FDX will allow downstream (DS) and upstream (US) transmissions to use the same radio frequency (RF) spectrum at the same time to increase the spectral efficiency in a cable network. As the downstream and upstream spectrums overlap in time and frequency in FDX, interference may occur between transmissions and receptions.

In order to implement FDX in a cable network, cable modems may be partitioned into interference groups. An interference group is a set of cable modems in which upstream and downstream signals of cable modems interfere with each other. Once interference groups have been identified the head-end (i.e. the CMTS 120) can schedule full duplex upstream and downstream packets to the cable modems so that they do not collide in time and frequency.

While a cable network operates in FDX, a cable modem in the FDX-mode cable network may operate on separate frequency bands for upstream and downstream (i.e. in a frequency division duplex (FDD) mode) to avoid upstream interference to downstream in any FDX sub-band.

Upstream transmit power levels are significantly higher compared to the downstream received power levels. Part of the upstream signal leaks into the downstream data path via a directional coupler. In addition to that, a cable modem also gets reflections of the upstream signals from the HFC path coming back to the cable modem with considerable power levels.

The upstream self-interference in a cable network has two elements: adjacent channel interference (ACI) due to an in-band high power upstream signal, and adjacent leakage interference (ALI) due to out-of-band leakage of an upstream signal, which may be in-band of a downstream channel. ACI is the echo of the transmission in an upstream sub-band. ACI can cause saturation of a downstream analog-to-digital converter (ADC), which would require additional back off to avoid clipping and hence losing the ADC dynamic range and raising the ADC quantization noise floor. On the other hand, ALI is the echo from the leakage of the upstream transmission into a downstream sub-band. The DOCSIS FDX specification allows up to −44 dBr of leakage. ALI directly affects the modulation error ratio (MER) of a downstream channel acting as an in-band interferer. It may be needed to cancel the ALI and the ACI to remove the effects of self-interference on a cable modem. The cable modem needs to deal with high power adjacent channels as well as the leakage from these adjacent channels into the downstream channels.

Figure 2:
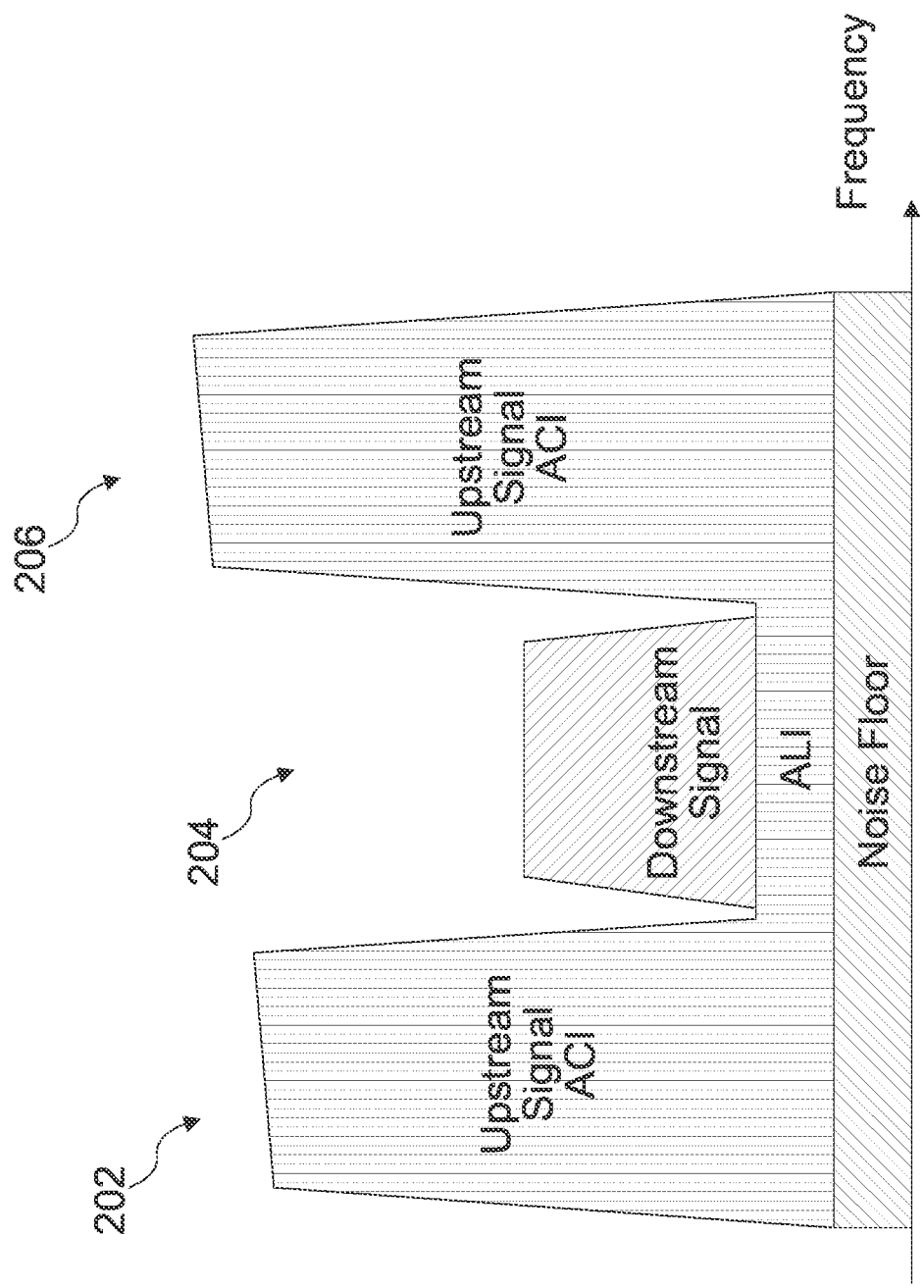
FIG. 2 shows an example of FDX sub-band assignments and adjacent channel interference (ACI) and adjacent leakage interference (ALI)

FIG. 2 shows an example of FDX sub-band assignments and ACI and ALI. Under the current DOCSIS standards, the FDX band includes three sub-bands. In the example shown in FIG. 2, the low and high sub-bands 202, 206 of the FDX band are assigned for upstream and the middle sub-band 204 is assigned for downstream. FIG. 2 shows the ACI due to the upstream transmissions on the low and high sub-bands 202, 206 and the ALI to the middle sub-band 204 due to the low and high sub-band upstream transmissions.

In order to implement FDX, echo-cancellation (EC) techniques may be employed to allow concurrent transmissions and receptions in adjacent FDX sub-bands. No EC was needed in previous DOCSIS standards (v3.1 or earlier) because the upstream and downstream bands were placed in fixed bands separated by a guard-band, sufficiently wide to enable separation using practical analog filters. In DOCSIS FDX, the FDX band is split to 3 sub-bands, as shown in FIG. 2, each of which may be assigned either as upstream or downstream, without a practical guard band between the FDX sub-bands. Under the current DOCSIS standards, the gap between the FDX sub-bands is very narrow, making it impractical for good separation using analog filters. However, using analog filters for separating specific sub-band(s) may be useful in conjunction with EC, such that the EC requirements for implementing FDX can be relaxed significantly.

Due to the fact that there are numerous (e.g. 8 or 7 for three FDX sub-bands) possible resource block assignments (RBA) of the FDX sub-bands (each sub-band may be assigned for either DS or US by the network), and that RBA may be changed dynamically by the CMTS, there is a need for an analog filter capable of switching dynamically to match the RBA state. Thus, in examples disclosed herein a switchable analog filter (SAF) may be used together with EC mechanisms.

The challenge with the SAF is related to sub-bands remaining in the same state (US or DS) when an RBA changes. The sub-bands remaining in the same state may need to continue operating throughout the switch seamlessly without any need to stop, retrain, or recalibrate. For example, when performing an RBA change for the three FDX sub-bands from DDU to DUU ('D' stands for downstream and 'U' stands for upstream), the middle sub-band changes from DS to US and the first and third sub-bands remain in the same state. In this case, the first and third sub-bands may need to continue operating seamlessly. When switching the SAF according to the RBA change, the frequency response (on the first and third sub-bands in this example) may change significantly. This would prevent a smooth transition of the system.

In examples disclosed herein, the changed frequency response due to SAF switching may be compensated by using digital compensation filters (DCF), making the SAF switching transparent to the rest of the system behind it. This scheme is practical since the total number of SAF configurations is not very large.

The DCF may have either the same frequency response as response of the SAFs in the same sub-band or its inverse. More accurately, the ratio between the frequency responses in different SAF states (i.e. the states of the SAF tuned to different frequency bands) may be the same as the ratio between the responses of the corresponding DCF states (or their inverses). Appropriate delays or other synchronization techniques may be implemented to make sure that the SAF and DCF switching affects the system concurrently.

Figure 3:
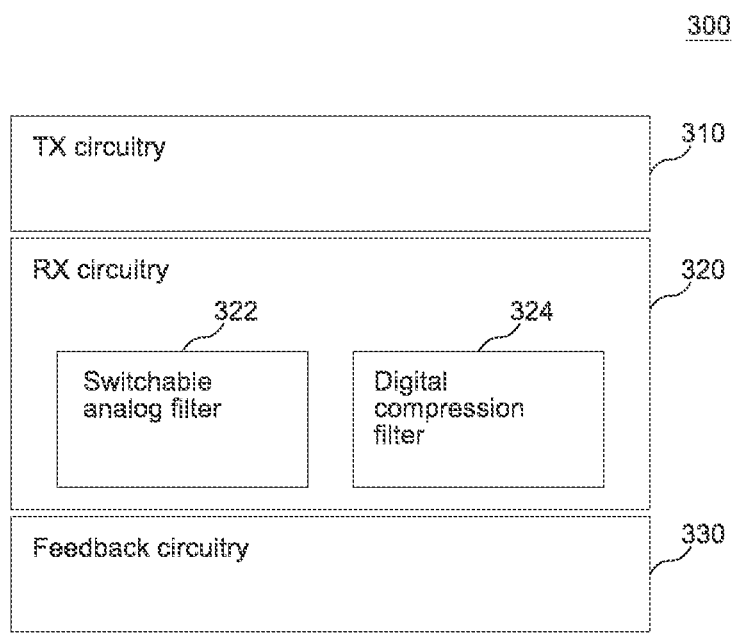
FIG. 3 is a block diagram of an example cable modem in accordance with one example.

FIG. 3 is a block diagram of an example cable modem 300 in accordance with one example. The cable modem 300 may be a stand-alone device or an integrated device which may be called a gateway, or the like. The cable modem 300 may include a transmit circuitry 310 and a receive circuitry 320. The transmit circuitry 310 is configured to process a transmit signal to be transmitted via a connector (not shown). The receive circuitry 320 is configured to process a receive signal received via the connector. The receive circuitry 320 may include a switchable analog filter 322 and a digital compensation filter 324. The switchable analog filter 322 is configured to filter the receive signal for a configured frequency band. The switchable analog filter 322 is configurable for different passband frequencies such that the switchable analog filter 322 may pass and stop different frequency bands at different states. The digital compensation filter 324 is configured to compensate (i.e. counter-act) a difference in frequency response of the switchable analog filter in a specific frequency band(s) after the switchable analog filter 322 is switched for a different passband frequency.

The cable modem 300 may include a feedback circuitry 330. The feedback circuitry 330 may be configured to process a feedback signal obtained by tapping a fraction of a power of the transmit signal for echo cancellation.

Figure 4:
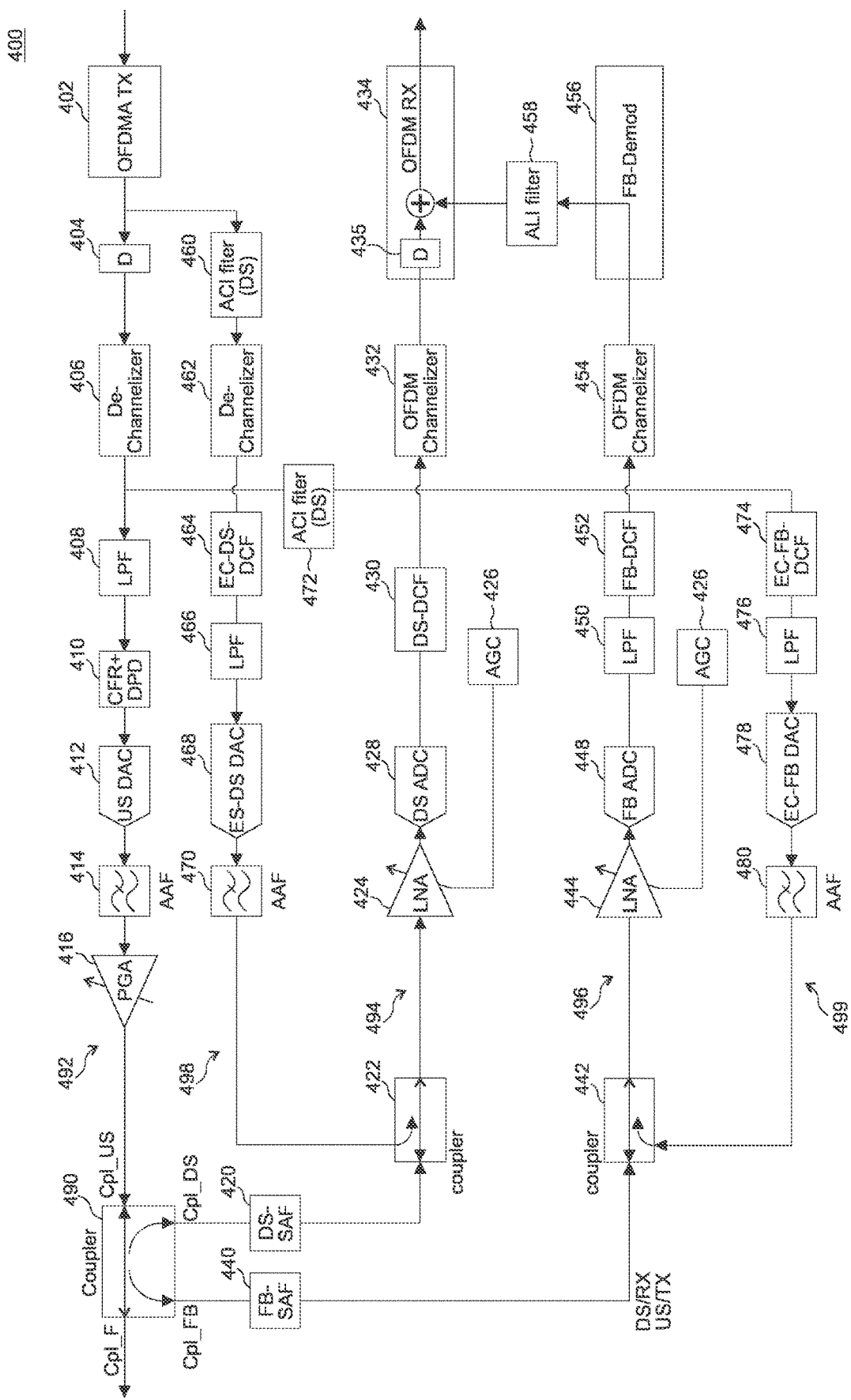
FIG. 4 is a block diagram of an example cable modem in accordance with one example.

FIG. 4 is a block diagram of an example cable modem 400 in accordance with one example. The cable modem 400 includes analog-front end (AFE) components and digital components including baseband (BB) components. It should be noted that the architecture shown in FIG. 4 is provided as an example, not as a limitation, and the architecture may be configured differently. For example, some processing in digital domain may be processed in analog domain, or vice versa, and some processing performed in baseband components may be processed in AFE components, vice versa.

The cable modem 400 may include an upstream (transmit) path 492 (i.e. circuitry for transmit processing), a downstream (receive) path 494 (i.e. circuitry for receive processing), and/or a feedback path 496 (circuitry for echo cancellation). The cable modem 400 includes digital-to-analog converters (DACs) and analog-to-digital converters (ADCs) for upstream transmission and downstream reception, respectively. The US DAC 412 on the upstream path 492 is for upstream transmission, and the DS ADC 428 on the downstream path 494 is for downstream reception. The cable modem 400 also includes auxiliary processing paths 496, 498, 499 (circuitries) to subtract the self-interfering transmit signal (i.e. ACI and ALI) from the received signal. The EC-DS DAC 468 and EC-FB DAC 478 are used for ACI cancellation in an analog domain on the downstream path 494 and the feedback path 496, respectively. The FB ADC 448 on the feedback path 496 is used for ALI cancellation and echo channel training.

The orthogonal frequency division multiple access (OFDMA) transmitter 402 is an upstream transmitter for modulating the upstream data to be transmitted by the cable modem 400. A delay block 404 may be added in the upstream path 492 for synchronization of the ACI cancellation signal from the processing path 498 and the downstream signal on the downstream path 494 at the coupler 422. Filtering, rate conversion, and the like may be performed on the OFDM modulated upstream transmit data by the de-channelizer 406. The de-channelizer 406 up-samples and multiplexes individual upstream channels with appropriate frequency shifts into a single higher sample rate upstream signal. The modulated upstream data may be then processed by the low-pass filter (LPF) 408 for anti-aliasing, and a crest factor reduction (CFR) and digital pre-distortion (DPD) unit 410 for efficient operation of the power amplifier. The upstream analog transmission signal is generated by the US DAC 412, and may subsequently be filtered by an anti-aliasing filter (AAF) 414 and amplified by the programmable gain amplifier (PGA) 416. This signal passes through the main coupler 490, and then passes onto an F-connector (not shown) and to the coaxial cable plant. The echo is the signal reflected back from the coaxial cable plant into the downstream port of the coupler 490.

The received downstream signal is coupled to the downstream path 494 via the coupler 490. The downstream signal is filtered by the SAF 420. The SAF 420 is a bandpass/bandstop filter for passing the downstream sub-band(s) and blocking the upstream sub-band(s). The SAF 420 is switchable for different frequency bands so that when the RBA changes, the SAF 420 may be switched for a different passband frequency accordingly. For example, the SAF 420 may include an input switch followed by a bank of filters for different frequencies followed by an output switch such that one of the filters may be switched on in accordance with a control signal generated based on the RBA. Any conventional switchable analog filter may be employed.

After filtered by the SAF 420, ACI may then be cancelled from the downstream signal at the coupler 422 (i.e. a combiner) in an analog domain. The ACI cancellation signal is generated from the processing path 498, which will be explained below. The downstream signal after ACI cancellation is amplified by a low noise amplifier (LNA) 424, whose gain is controlled by the automatic gain control (AGC) 426, and then converted to a digital signal by the DS ADC 428.

The downstream data in digital domain may then be processed by the DS DCF 430 for compensation of the difference in frequency response of the SAF 420 due to switching of the SAF 420, when an RBA change occurs.

When the RBA changes, a certain FDX sub-band may remain in the same state. For example, if the RBA changes from DDU to DUU, the lower sub-band remains in DS and the upper sub-band remains in US, but the middle sub-band changes from DS to US. When the RBA changes the SAF 420 needs to switch to a different state accordingly, and when doing so, the frequency response of the SAF 420 in the lower and upper sub-bands in this example may change significantly (even though it still needs to pass the lower DS sub-bands and stop the upper US sub-band). In order to enable continuous and seamless operation in these sub-bands, this change needs to be compensated.

In examples, in order to obtain this compensation, the DCF 430 may be used, such that its effect counter-acts the change of the frequency response of the SAF 420 due to the SAF switching. In one example, the DCF 430 may be placed in the downstream path 494 either in the passband or in the baseband (i.e. either before or after the OFDM channelizer 432). FIG. 4 shows the DCF 430 placed in the passband before the OFDM channelizer 432 as an example, but it may be moved after the OFDM channelizer 432. The frequency response of the DCF 430 in the DS sub-band (more generally sub-bands) is the inverse of the change of frequency response of the SAF 420 inside the corresponding sub-band(s). More accurately, the product of the frequency responses of the DCF 430 and the SAF 420 may be independent of the SAF state and reasonably flat.

The OFDM channelizer 432 may perform filtering and/or rate conversion on the digital signal to extract a specific frequency band. The OFDM receiver 434 is the downstream receiver (i.e. demodulator) for demodulating the received signal. The OFDM receiver 434 is also used for echo channel training. The OFDM receiver 434 may include a delay block 435 for synchronization of the ALI cancellation signal from the feedback path 496 and the downstream signal on the downstream path 494.

For ACI cancellation in the DS path 494, the ACI reference signal, that may be taken from the output of the OFDMA transmitter 402, is filtered by the ACI filter 460, and then de-channelized by the de-channelizer 462. The coefficients of the ACI filter 460 may be determined via echo channel training. The de-channelized ACI reference signal may be filtered by the EC-DS DCF 464 to impose the same change in frequency response of the SAF 420 due to the SAF switching for a different frequency band(s).

After processed by the EC-DS DCF 464, the ACI reference signal may be filtered by an LPF 466 for anti-aliasing, converted to an analog signal by the EC-DS DAC 468 and may then be filtered by the AAF 470, and then combined with the received downstream signal at the coupler 422 for ACI cancellation.

A fraction of the upstream signal is tapped to the feedback path 496 at the coupler 490. This signal is referred to as a feedback signal. The feedback path 496 is provided to subtract the self-interfering signal (the echo of the upstream signal) from the received signal (i.e. ALI cancellation). The feedback (FB) port of the coupler 490 is connected directly to the output of the PGA 416, and is disconnected from the coaxial cable plant. Therefore, it can serve as a reference signal for echo cancellation. The feedback signal is filtered by an SAF 440. The SAF 440 is a bandpass/bandstop filter for passing the leakage signal in the downstream sub-band(s) and blocking the upstream sub-band(s). The SAF 440 is switchable for different frequency bands so that when the RBA changes, the SAF 440 may be switched for a different passband frequency accordingly. For example, the SAF 440 may include an input switch followed by a bank of filters for different frequencies followed by an output switch such that one of the filters may be switched on in accordance with a control signal generated based on the RBA.

After filtered by the SAF 440, ACI may be cancelled from the feedback signal at the coupler 442 (i.e. a combiner) in an analog domain. The ACI cancellation signal is generated from the processing path 499, which will be explained below. The feedback signal after ACI cancellation is amplified by an LNA 444, whose gain is controlled by the AGC 446, and then converted to a digital signal by the FB ADC 448, and may then be filtered by the LPF 450.

Similar to the digital compensation in the DS path 494, the feedback signal in digital domain may be processed by the FB DCF 452 for compensation of the difference in frequency response of the SAF 440 due to switching of the SAF 440 for a different frequency band(s). As the RBA for the cable modem changes, the SAF 440 may be switched for different frequency sub-bands and, as a result, the frequency response of the SAF 440 may change. In order to compensate for this difference, the DCF 452 may be used, such that its effect counteracts the change of the frequency response of the SAF 440 due to the SAF switching.

In one example, the DCF 452 may be placed in the feedback path 496 either in the passband or in the baseband (i.e. either before or after the OFDM channelizer 454). FIG. 4 shows the DCF 452 placed in the passband before the OFDM channelizer 454 as an example, but it may be moved after the OFDM channelizer 454. The frequency response of the DCF 452 in the DS sub-band (more generally sub-bands) is the inverse of the change of the frequency response of the SAF 440 inside the corresponding sub-band(s). More accurately, the product of the frequency responses of the DCF 452 and the SAF 440 may be independent of the SAF state and reasonably flat.

The OFDM channelizer 454 may perform filtering and/or rate conversion to extract a specific frequency band. The feedback demodulator 456 is an OFDM receiver used for training the echo channel. The feedback signal is then processed by the ALI filter 458 and then subtracted from the downstream data for ALI cancellation. The coefficients of the ALI filter 458 may be determined via echo channel training.

For ACI cancellation in the feedback path 496, the ACI reference signal that may be taken from the output of the de-channelizer 406 in the upstream path 492 is filtered by the ACI filter 472. Alternatively, the ACI reference signal may be taken out of the OFDM transmitter 402. The de-channelized reference signal may be filtered by the DCF 474 to impose the same change in frequency response of the SAF 440 due to the switching of the SAF 440 for a different frequency band(s).

The ACI reference signal is then filtered by the LPF 476 for anti-aliasing and converted to an analog signal by the EC-FB DAC 478 and may be filtered by the AAF 480, and then combined with the feedback signal at the coupler 442 for ACI cancellation.

The ACI filters 460, 472 are filters used for cancelling ACI on the downstream path 494 and the feedback path 496, respectively. One filter 460 may be used for canceling the ACI on the downstream path 494 and another filter 472 may be used for canceling the ACI on the feedback path 496. There may be one ACI filter per upstream channel. The ACI filter coefficients are the trained echo channel response for ACI. The ACI filters 460, 472 use the reference signal (e.g. the transmit upstream signal in a time domain, or alternatively in a frequency domain) as input and the output from the ACI filters 460, 472 are converted to analog signals by the DACs 468, 478 for ACI cancellation at the couplers 422, 442, respectively, in an analog domain.

The ALI filter 458 is a filter for canceling the ALI on the downstream path 494. There may be one ALI filter per downstream channel. The ALI filter coefficients are the trained echo channel response for ALI. In one example, the ALI filter 458 may take the reference signal (e.g. the feedback path signal taken at the output of the channelizer 454) as input and the output of the ALI filter 458 is added to (or subtracted from) the downstream channelized signal. In this example, the ALI cancellation is performed in a digital domain.

The filter coefficients of the DCFs 430, 452, 464, 474 may be pre-determined (pre-calibrated) for all possible switching of the SAF 420, 440 (i.e. for all possible SAF states) such that when the SAF 420, 440 switches the DCFs 430, 452, 464, 474 may be re-configured with the filter coefficients corresponding to the SAF switching. The filter coefficients of the DCFs 430 and 464 and the filter coefficients of the DCFs 452 and 474 may be pre-calibrated for all possible switching of the SAF 420 and 440, respectively (i.e. for all possible SAF states) and stored such that whenever the SAF 420 and 440 are switched to a different passband frequency, the filter coefficients for the DCFs 430 and 464, and the filter coefficients of the DCFs 452 and 474 may be read from the corresponding coefficients tables, respectively, that are prepared and stored in advance.

In examples, as shown in FIG. 4, two SAFs 420, 440 may be used on the DS path 494 and the FB path 496, respectively. These filters 420, 440 act as bandpass-bandstop filter, allowing the DS sub-band(s) to pass through and stop the US sub-band(s), according to the current RBA setting. These filters mitigate some of the ACI and enable a lower (weaker) ACI cancellation signal, having a lower quantization floor, generated by the EC DAC (in the DS and/or FB path).

When the SAF 420, 440 switches due to the RBA changes, the DCFs 430, 452, 464, 474 need to switch accordingly. In general, a transient effect may not be avoided altogether. In order to minimize the transient effect, switching of the DCFs need to be well synchronized with the propagation of the SAF switching effect. In other words, when the SAF 420, 440 switches, the DCFs 430, 452, 464, 474 also need to switch, but not exactly at the same time, but when the SAF switching effect arrives. It is expected to have some delay, because of the processing latency, and step-response of the signal path (both analog and digital), etc. For example, the DCFs 430 and 452 need to switch after the SAFs 420 and 440 switch, respectively, at the time the downstream signal and the feedback signal arrive at the DCFs 430 and 452 after passing through the SAF 420, 440.

Asynchronous DCF switching could result in imperfect echo cancellation, or in mismatched equalization coefficients in the OFDM receiver 434, which are likely to cause data loss in their respective channels. The DOCSIS FDX standard is very intolerable to data loss, requiring a packet error rate (PER) of less than $1 \times 10^{-6}$, such that packet loss may not be accepted, even in switching events.

DCFs may be employed in processing paths 498, 499 for the ACI cancellation signal. The EC-DS DCF 464 and the EC-FB DCF 474 are located on the signal processing paths 498, 499, which feed the EC-DS DAC 468 and the EC-FB DAC 478, respectively. In this case, the response of the DCFs 464, 474 may be the same as that of their corresponding SAF 440 inside the relevant US sub-bands, and not the inverse, as in the case of the downstream path 494.

The switching of these DCFs 464, 474 also needs to be synchronized with the switching of the SAFs 420, 440, such that the propagation of the switching effects of the DCF 464, 474 and the SAF 420, 440 arrive exactly at the same time at their couplers 422 and 442, respectively. Misalignment could result in temporary saturations in either the DS ADC 428 or the FB ADC 448. Since full-band capture technology is usually employed in cable modem ADC, this would potentially affect legacy DS channels, outside the FDX band, which in turn, may result in data loss.

In an alternative example, the DS DCF 430 may not be used, if each RBA switching would include a change to reacquire the channel. This means that the cable modem changing their RBA would not get any DS allocations inside the FDX band until the cable modem reacquires the channel (re-estimates a channel and/or equalization coefficients).

In another examples, the EC-DS DCF 464, the EC-FB DCF 474, and the FB DCF 452 may be eliminated and their responses may be incorporated into the DS ACI filter 460, the FB ACI filter 472, or the ALI filter 458, respectively. In another example, the DS DCF 430 may be eliminated and its response may be incorporated into the OFDM receiver 434 (i.e. the equalizer filter in the OFDM receiver 434).

The above alternative examples would necessitate an EC retraining session to be performed by the cable modem (possibly, in collaboration with the CMTS) in case of SAF switching. These alternatives would mitigate the switching effect and relax some of the requirements on the DCFs. However, there would be implication on the medium access sub-layer (MAC), where the system would need to either reacquire the channel (e.g. re-estimate the DS channel response and equalization coefficients) or retrain all or some of the echo-cancellation filters.

The examples described here are efficient, as they make the system behind it completely oblivious to the SAF switching. By using SAFs the performance may be boosted by up to about 6 dB using passive components (not increasing the system's power consumption) and at a reasonable increase in system complexity. Without seamless RBA change, each time an RBA changes and the SAF changes accordingly, the system may redo EC training and/or channel acquisition (e.g., DS channel estimation). This will not allow for fast-RBA switching and thus will not be compliant with the requirements of the DOCSIS FDX specifications. The examples disclosed herein enable a performance gain of about 6 dB, while still supporting fast RBA switching, as required by the DOCSIS FDX specification.

Figure 5:
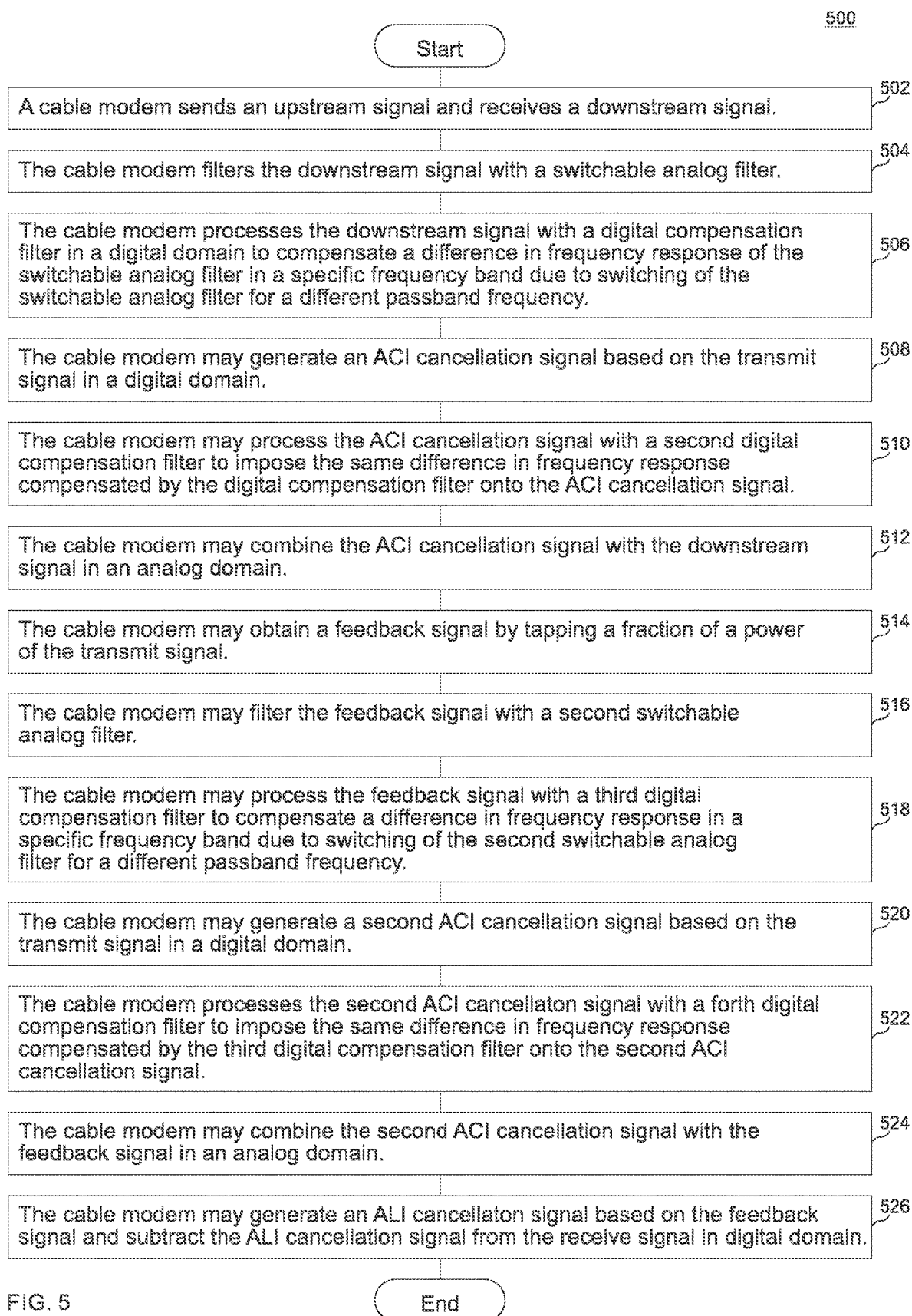
FIG. 5 is a flow diagram of an example process of compensating an effect of filter switching in an FDX cable modem.

FIG. 5 is a flow diagram of an example process 500 of compensating an effect of filter switching in an FDX cable modem. A cable modem sends an upstream signal and receives a downstream signal (502). The cable modem filters the downstream signal with a switchable analog filter (504). The switchable analog filter is configurable for different passband frequencies and switched for one of the passband frequencies in response to an RBA change. The cable modem processes the downstream signal with a digital compensation filter in a digital domain to compensate a difference in frequency response of the switchable analog filter in a specific frequency band due to switching of the switchable analog filter for a different passband frequency (506).

The cable modem may generate an ACI cancellation signal based on the transmit signal in a digital domain for ACI cancellation in the downstream path (508). The cable modem may process the ACI cancellation signal with a second digital compensation filter to impose the same difference in frequency response compensated by the digital compensation filter onto the ACI cancellation signal (510). The cable modem may then combine the ACI cancellation signal with the downstream signal in an analog domain (512).

The cable modem may obtain a feedback signal by tapping a fraction of a power of the transmit signal (514). The cable modem may filter the feedback signal with a second switchable analog filter (516). The second switchable analog filter is configurable for different passband frequencies and switched for one of the passband frequencies in response to an RBA change. The cable modem may process the feedback signal with a third digital compensation filter to compensate a difference in frequency response in a specific frequency band due to switching of the second switchable analog filter for a different passband frequency (518).

The cable modem may generate a second ACI cancellation signal based on the transmit signal in a digital domain for ACI cancellation in the feedback path (520). The cable modem processes the second ACI cancellation signal with a forth digital compensation filter to impose the same difference in frequency response compensated by the third digital compensation filter onto the second ACI cancellation signal (522). The cable modem may combine the second ACI cancellation signal with the feedback signal in an analog domain (524). The cable modem may generate an ALI cancellation signal based on the feedback signal and subtract the ALI cancellation signal from the receive signal in a digital domain (526).

Another example is a computer program having a program code for performing at least one of the methods described herein, when the computer program is executed on a computer, a processor, or a programmable hardware component. Another example is a machine-readable storage including machine readable instructions, when executed, to implement a method or realize an apparatus as described herein. A further example is a machine-readable medium including code, when executed, to cause a machine to perform any of the methods described herein.

The examples as described herein may be summarized as follows:

Example 1 is a cable modem supporting FDX operations. The cable modem includes a transmit circuitry configured to process a transmit signal, and a receive circuitry configured to process a receive signal. The receive circuitry includes a switchable analog filter configured to filter the receive signal, wherein the switchable analog filter is configurable for different passband frequencies, and a digital compensation filter configured to compensate a difference in frequency response in a specific frequency band due to switching of the switchable analog filter for a different passband frequency.

Example 2 is the cable modem of example 1, further including an ACI cancellation filter configured to generate an ACI cancellation signal based on the transmit signal in a digital domain, and a second digital compensation filter configured to process the ACI cancellation signal to impose the same difference in frequency response compensated by the digital compensation filter onto the ACI cancellation signal, wherein the ACI cancellation signal after processing by the second digital compensation filter is combined with the receive signal in an analog domain.

Example 3 is the cable modem of example 2, further including a feedback circuitry configured to process a feedback signal obtained by tapping a fraction of a power of the transmit signal, wherein the feedback circuitry includes a second switchable analog filter configured to filter the feedback signal, wherein the second switchable analog filter is configurable for different passband frequencies, and a third digital compensation filter configured to process the feedback signal to compensate a difference in frequency response in a specific frequency band due to switching of the second switchable analog filter for a different passband frequency.

Example 4 is the cable modem of example 3, further including a second ACI cancellation filter configured to generate a second ACI cancellation signal based on the transmit signal in a digital domain, and a fourth digital compensation filter configured to process the second ACI cancellation signal to impose the same difference in frequency response compensated by the third digital compensation filter onto the second ACI cancellation signal, wherein the second ACI cancellation signal after processing by the fourth digital compensation filter is combined with the feedback signal in an analog domain.

Example 5 is the cable modem as in any one of examples 3-4, further including an ALI cancellation filter configured to generate an ALI cancellation signal based on the feedback signal after processed by the third digital compensation filter, wherein the ALI cancellation signal is subtracted from the receive signal in a digital domain.

Example 6 is the cable modem as in any one of examples 2-5, wherein the ACI cancellation filter and the second digital compensation filter are integrated into a single filter, the second ACI cancellation filter and the fourth digital compensation filter are integrated into a single filter, and/or the third digital compensation filter and the ALI cancellation filter are integrated into a single filter.

Example 7 is the cable modem as in any one of examples 2-5, wherein filter coefficients of at least one of the digital compensation filter, the second digital compensation filter, the third digital compensation filter, or the fourth digital compensation filter are pre-calibrated for all possible switching of the switchable analog filter and the second switchable analog filter and read from a coefficients table if the switchable analog filter or the second switchable analog filter is switched for a different passband frequency.

Example 8 is the cable modem as in any one of examples 1-7, wherein timing of switching of the switchable analog filter and reconfiguration of the digital compensation filter are controlled such that effects of the switching of the switchable analog filter and the reconfiguration of the digital compensation filter occur at the same time.

Example 9 is a method of compensating an effect of filter switching in a FDX cable modem. The method includes sending an upstream signal, receiving a downstream signal, filtering the downstream signal with a switchable analog filter, wherein the switchable analog filter is configurable for different passband frequencies and switched for one of the passband frequencies in response to a resource block assignment, RBA, change, and processing the downstream signal with a digital compensation filter in a digital domain to compensate a difference in frequency response of the switchable analog filter in a specific frequency band due to switching of the switchable analog filter for a different passband frequency.

Example 10 is the method of example 9, further including generating an ACI cancellation signal based on the transmit signal in a digital domain, processing the ACI cancellation signal with a second digital compensation filter to impose the same difference in frequency response compensated by the digital compensation filter onto the ACI cancellation signal, and combining the ACI cancellation signal with the downstream signal in an analog domain.

Example 11 is the method of example 10, further including obtaining a feedback signal by tapping a fraction of a power of the transmit signal, filtering the feedback signal with a second switchable analog filter, wherein the second switchable analog filter is configurable for different passband frequencies and switched for one of the passband frequencies in response to an RBA change, and processing the feedback signal with a third digital compensation filter to compensate a difference in frequency response in a specific frequency band due to switching of the second switchable analog filter for a different passband frequency.

Example 12 is the method of example 11, further including generating a second ACI cancellation signal based on the transmit signal in a digital domain, processing the second ACI cancellation signal with a forth digital compensation filter to impose the same difference in frequency response compensated by the third digital compensation filter onto the second ACI cancellation signal, and combining the second ACI cancellation signal with the feedback signal in an analog domain.

Example 13 is the method as in any one of examples 11-12, further including generating an ALI cancellation signal based on the feedback signal, and subtracting the ALI cancellation signal from the receive signal in a digital domain.

Example 14 is the method as in any one of examples 9-13, further including reading filter coefficients of at least one of the digital compensation filter, the second digital compensation filter, the third digital compensation filter, or the fourth digital compensation filter from a coefficients table that is pre-calibrated for all possible switching of the switchable analog filter and the second switchable analog filter.

Example 15 is the method as in any one of examples 9-14, wherein timing of switching of the switchable analog filter and reconfiguration of the digital compensation filter are controlled such that effects of the switching of the switchable analog filter and the reconfiguration of the digital compensation filter occur at the same time.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a sensor signal", "means for generating a transmit signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A cable modem supporting full duplex (FDX) operations, comprising:
    a transmit circuitry configured to process a transmit signal; and
    a receive circuitry configured to process a receive signal from a hybrid fiber coaxial (HFC) network, wherein the receive circuitry includes:
        a switchable analog filter configured to filter the receive signal, wherein the switchable analog filter is configurable for different passband frequencies; and
        a first digital compensation filter configured to compensate a difference in frequency response in a specific frequency band due to switching of the switchable analog filter for a different passband frequency, wherein timing of switching of the switchable analog filter and reconfiguration of the first digital compensation filter are controlled such that effects of the switching of the switchable analog filter and the reconfiguration of the first digital compensation filter occur at the same time.

2. The cable modem of claim 1, further comprising:
    an adjacent channel interference (ACI) cancellation filter configured to generate an ACI cancellation signal based on the transmit signal in a digital domain; and
    a second digital compensation filter configured to process the ACI cancellation signal to impose the same difference in frequency response compensated by the first digital compensation filter onto the ACI cancellation signal, wherein the ACI cancellation signal after processing by the second digital compensation filter is combined with the receive signal in an analog domain.

3. The cable modem of claim 2, further comprising:
    a feedback circuitry configured to process a feedback signal obtained by tapping a fraction of a power of the transmit signal, wherein the feedback circuitry includes:
    a second switchable analog filter configured to filter the feedback signal, wherein the second switchable analog filter is configurable for different passband frequencies; and
    a third digital compensation filter configured to process the feedback signal to compensate a difference in frequency response in a specific frequency band due to switching of the second switchable analog filter for a different passband frequency.

4. The cable modem of claim 3, further comprising:
    a second ACI cancellation filter configured to generate a second ACI cancellation signal based on the transmit signal in a digital domain; and
    a fourth digital compensation filter configured to process the second ACI cancellation signal to impose the same difference in frequency response compensated by the third digital compensation filter onto the second ACI cancellation signal, wherein the second ACI cancellation signal after processing by the fourth digital compensation filter is combined with the feedback signal in an analog domain.

5. The cable modem of claim 4, wherein the ACI cancellation filter and the second digital compensation filter are integrated into a single filter, the second ACI cancellation filter and the fourth digital compensation filter are integrated into a single filter, and/or the third digital compensation filter and the ALI cancellation filter are integrated into a single filter.

6. The cable modem of claim 4, wherein filter coefficients of at least one of the first digital compensation filter, the second digital compensation filter, the third digital compensation filter, or the fourth digital compensation filter are pre-calibrated for all possible switching of the switchable analog filter and the second switchable analog filter and read from a coefficients table if the switchable analog filter or the second switchable analog filter is switched for a different passband frequency.

7. The cable modem of claim 3, further comprising:
    an adjacent leakage interference (ALI) cancellation filter configured to generate an ALI cancellation signal based on the feedback signal after processed by the third digital compensation filter, wherein the ALI cancellation signal is subtracted from the receive signal in a digital domain.

8. The cable modem of claim 1 wherein the switchable analog filter is switched for one of the passband frequencies in response to a resource block assignment (RBA) change.

9. A method of compensating an effect of filter switching in a full duplex (FDX) cable modem, the method comprising:
sending an upstream signal;
receiving a downstream signal from a hybrid fiber coaxial (HFC) network;
filtering the downstream signal with a switchable analog filter, wherein the switchable analog filter is configurable for different passband frequencies;
processing the downstream signal with a first digital compensation filter in a digital domain to compensate a difference in frequency response of the switchable analog filter in a specific frequency band due to switching of the switchable analog filter for a different passband frequency;
generating an adjacent channel interference (ACI) cancellation signal based on the upstream signal in a digital domain;
processing the ACI cancellation signal with a second digital compensation filter to impose the same difference in frequency response compensated by the digital compensation filter onto the ACI cancellation signal; and
combining the ACI cancellation signal with the downstream signal in an analog domain.

10. The method of claim 9, further comprising:
obtaining a feedback signal by tapping a fraction of a power of the upstream signal; filtering the feedback signal with a second switchable analog filter, wherein the second switchable analog filter is configurable for different passband frequencies; and
processing the feedback signal with a third digital compensation filter to compensate a difference in frequency response in a specific frequency band due to switching of the second switchable analog filter for a different passband frequency.

11. The method of claim 10, further comprising:
generating a second ACI cancellation signal based on the upstream signal in a digital domain;
processing the second ACI cancellation signal with a fourth digital compensation filter to impose the same difference in frequency response compensated by the third digital compensation filter onto the second ACI cancellation signal; and
combining the second ACI cancellation signal with the feedback signal in an analog domain.

12. The method of claim 11, further comprising:
reading filter coefficients of at least one of the first digital compensation filter, the second digital compensation filter, the third digital compensation filter, or the fourth digital compensation filter from a coefficients table that is pre-calibrated for all possible switching of the switchable analog filter and the second switchable analog filter.

13. The method of claim 10, further comprising:
generating an adjacent leakage interference (ALI) cancellation signal based on the feedback signal; and
subtracting the ALI cancellation signal from the receive signal in a digital domain.

14. The method of claim 9, wherein timing of switching of the switchable analog filter and reconfiguration of the first digital compensation filter are controlled such that effects of the switching of the switchable analog filter and the reconfiguration of the first digital compensation filter occur at the same time.

15. The method of claim 9 wherein the switchable analog filter is switched for one of the passband frequencies in response to a resource block assignment (RBA) change.

16. A non-transitory computer storage medium including machine-readable instructions, when executed, to implement a method as in claim 9.

* * * * *